US009634697B2

(12) United States Patent
Natesan et al.

(10) Patent No.: US 9,634,697 B2
(45) Date of Patent: Apr. 25, 2017

(54) ANTENNA SELECTION AND TUNING

(71) Applicant: QUALCOMM Incorporated, San Diego, CA (US)

(72) Inventors: Dineshbabu Natesan, Hyderabad (IN); Daniel Fred Filipovic, Solana Beach, CA (US); Ning He, Sammamish, WA (US); Yi-Chyun Chiou, San Diego, CA (US); Tarandeep Virk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 14/848,569

(22) Filed: Sep. 9, 2015

(65) Prior Publication Data

US 2017/0070246 A1 Mar. 9, 2017

(51) Int. Cl.
H04B 1/04 (2006.01)
H04B 1/40 (2015.01)

(52) U.S. Cl.
CPC ............. *H04B 1/0458* (2013.01); *H04B 1/40* (2013.01)

(58) Field of Classification Search
CPC ................................ H04B 1/0458; H04B 1/40
See application file for complete search history.

(56) References Cited

U.S. PATENT DOCUMENTS

| | | | | |
|---|---|---|---|---|
| 5,038,112 A * | 8/1991 | O'Neill | ..................... | H03G 7/00 330/207 P |
| 5,956,627 A * | 9/1999 | Goos | ........................ | H03G 1/04 455/126 |
| 6,100,567 A | 8/2000 | Burr | | |
| 6,118,409 A | 9/2000 | Pietsch et al. | | |
| 6,178,310 B1 * | 1/2001 | Jeong | ................... | H04B 17/318 455/121 |
| 6,362,685 B1 * | 3/2002 | Vagher | .................... | H03F 3/602 330/124 R |
| 6,727,152 B2 | 4/2004 | Mitani et al. | | |
| 7,115,460 B2 | 10/2006 | Shaw et al. | | |

(Continued)

FOREIGN PATENT DOCUMENTS

EP 2577799 A1 4/2013
JP 2007073885 A 3/2007

(Continued)

OTHER PUBLICATIONS

International Search Report and Written Opinion—PCT/US2016/046025—ISA/EPO—Nov. 11, 2016.

*Primary Examiner* — Devan Sandiford
(74) *Attorney, Agent, or Firm* — Arent Fox LLP

(57) ABSTRACT

A systems, methods and apparatus including a plurality of antennas are provided. The antenna system includes a first antenna, a second antenna, and a measurement device. The measurement device is configured to measure at least a first complex value indicative of an impedance matching of the first antenna and a second complex value indicative of an impedance matching of the second antenna. The antenna system includes an antenna selection controller configured to select one of the first antenna and the second antenna. The antenna selection controller making the selection based on the measurement of the first complex value of the first antenna and the measurement of the second complex value of the second antenna.

27 Claims, 6 Drawing Sheets

(56) References Cited

U.S. PATENT DOCUMENTS

| | | | |
|---|---|---|---|
| 8,058,137 B1 | 11/2011 | Or-Bach et al. | |
| 8,432,216 B2 | 4/2013 | Mazure et al. | |
| 8,443,306 B1 | 5/2013 | Dhong et al. | |
| 8,575,697 B2 | 11/2013 | Mazure et al. | |
| 2003/0228891 A1* | 12/2003 | Kobayashi | H01Q 1/242 455/575.5 |
| 2005/0215198 A1* | 9/2005 | Fifield | H04B 1/0475 455/63.1 |
| 2005/0255809 A1* | 11/2005 | Glueck | H03F 1/0211 455/69 |
| 2007/0020837 A1 | 1/2007 | Bryant et al. | |
| 2007/0093282 A1* | 4/2007 | Chang | H04B 7/0608 455/575.7 |
| 2007/0238496 A1* | 10/2007 | Chung | H04B 1/3838 455/575.7 |
| 2007/0250139 A1* | 10/2007 | Kanzius | A61N 1/406 607/100 |
| 2008/0180169 A1* | 7/2008 | Ripley | H03F 3/19 330/133 |
| 2008/0319285 A1* | 12/2008 | Hancock | A61B 5/0507 600/309 |
| 2009/0167457 A1* | 7/2009 | Melde | H01P 5/04 333/32 |
| 2010/0008455 A1* | 1/2010 | Willgert | H04B 7/10 375/346 |
| 2010/0222012 A1* | 9/2010 | Shibuya | H04B 1/525 455/79 |
| 2010/0296564 A1 | 11/2010 | Aryanfar et al. | |
| 2011/0024755 A1 | 2/2011 | Korenari et al. | |
| 2011/0049631 A1 | 3/2011 | Itaka | |
| 2011/0250926 A1* | 10/2011 | Wietfeldt | H01Q 1/243 455/525 |
| 2012/0168863 A1 | 7/2012 | Zhu et al. | |
| 2013/0038387 A1* | 2/2013 | Schmidhammer | G01R 27/06 327/563 |
| 2013/0122829 A1* | 5/2013 | Hyvonen | H01Q 21/30 455/77 |
| 2013/0214356 A1 | 8/2013 | Cheng et al. | |
| 2013/0241796 A1 | 9/2013 | Nagumo | |
| 2013/0322562 A1* | 12/2013 | Zhang | H04B 7/0404 375/267 |
| 2014/0192845 A1 | 7/2014 | Szini et al. | |
| 2015/0022237 A1 | 1/2015 | Ferrant | |
| 2015/0038094 A1 | 2/2015 | Maxim et al. | |
| 2015/0072632 A1* | 3/2015 | Pourkhaatoun | H04B 1/0458 455/127.2 |
| 2015/0325563 A1 | 11/2015 | Kamal et al. | |
| 2016/0173172 A1* | 6/2016 | Greene | H04B 7/0404 455/562.1 |
| 2016/0277129 A1* | 9/2016 | Manssen | H03H 7/40 |
| 2017/0026020 A1* | 1/2017 | Solomko | H01P 5/184 |

FOREIGN PATENT DOCUMENTS

| | | |
|---|---|---|
| KR | 20070033509 A | 3/2007 |
| WO | 2011084715 A1 | 7/2011 |

* cited by examiner

ANTENNA SELECTION AND TUNING

BACKGROUND

Field

The present disclosure relates generally to antennas, and more particularly, to selecting an antenna, tuning an antenna, or both.

Background

Wireless communication devices are widely deployed to provide various telecommunication services such as telephony, video, data, messaging, and broadcasts. Typical wireless communication devices may employ multiple-access technologies capable of supporting communication with multiple users by sharing available system resources (e.g., bandwidth, transmit power). Examples of such multiple-access technologies include, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. Generally, these wireless communication devices may transmit data, receive data, or both transmit data and receive data using an antenna, antennas, or an antenna system.

Wireless communication devices operating within such wireless communication devices may have multiple antennas. For example, such a wireless communication device may be a mobile telephone handset, so called "smart" phone, tablet computer, or another type of wireless communication device. Each of the multiple antennas of the wireless communication device may be, for example, within the wireless communication device or outside the wireless communication device. The multiple antennas may be within a case enclosing the rest of the communication device, attached to the case, protrude from the case, or otherwise be located relative to the case. Each antenna may be in a different location, relative to the other antennas in the wireless communication device. Additionally, each of these multiple antennas may have a different orientation relative to the other antennas in the wireless communication device. Because the antennas are in different locations and may have different orientations, each antenna may perform differently. This may be true even if the antennas are of the same type. Accordingly, it may be necessary to select from between these multiple antennas.

SUMMARY

In an aspect of the disclosure, a method and an apparatus for antenna selection are provided. The apparatus is an antenna system including a plurality of antennas. The antenna system includes a first antenna, a second antenna, and a measurement device. The measurement device is configured to measure at least a first complex value indicative of an impedance matching of the first antenna and a second complex value indicative of an impedance matching of the second antenna. The antenna system includes an antenna selection controller configured to select one of the first antenna and the second antenna. The antenna selection controller making the selection based on the measurement of the first complex value of the first antenna and the measurement of the second complex value of the second antenna.

DETAILED DESCRIPTION

Figure 1:
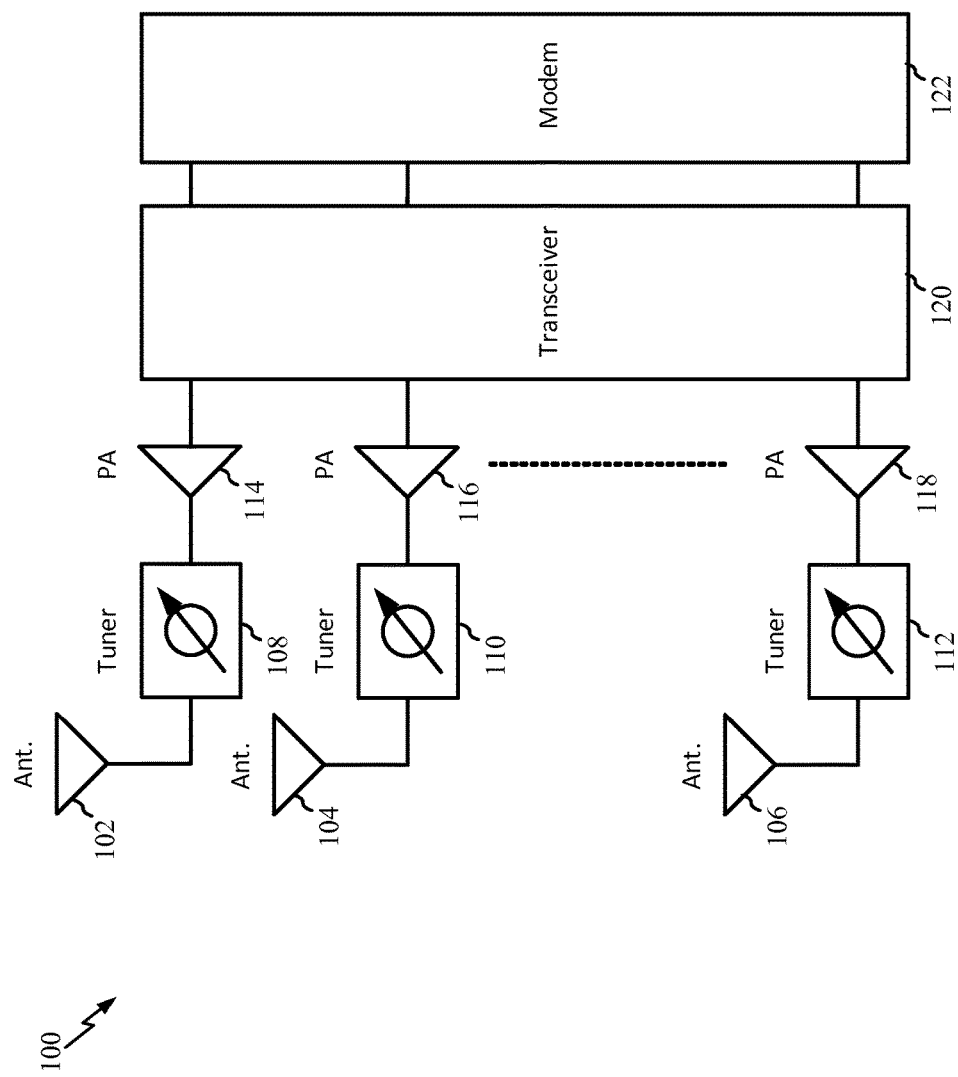
FIG. 1 is a diagram illustrating an example communication device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of multiple antenna devices and systems will now be presented with reference to various apparatus and methods. These apparatus and methods will be described in the following detailed description and illustrated in the accompanying drawings by various blocks, modules, components, circuits, steps, processes, and algorithms (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer-executable code in the form of instructions or data structures that can be accessed by a computer.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

FIG. 1 is a diagram illustrating an example communication device 100. The communication device 100 includes antennas 102, 104, 106. The antenna 102 is connected to tuner 108. The antenna 104 is connected to tuner 110. The antenna 106 is connected to tuner 112. The tuners 108, 110, and 112 may be used to tune their respective antennas 102, 104, or 106.

As illustrated in FIG. 1, the antenna 102 is driven by a power amplifier 114 that is coupled to the antenna 102 through the tuner 108. Similarly, the antenna 104 is driven by a power amplifier 116 that is coupled to the antenna 104 through the tuner 110. Finally, the antenna 106 is driven by a power amplifier 118 that is coupled to the antenna 106 through the tuner 112. Each of the power amplifiers 114, 116, 118 are connected to the transceiver 120. The transceiver 120 provides the input signals to the power amplifiers 114, 116, 118 and receives as its input modulated signals from the modem 122. The modem 122 encodes digital information that is to be transmitted using the rest of the communication device 100.

The communication device 100 may be part of a mobile telephone handset, for example. Mobile telephone handsets may experience call drops. Call drops, i.e., occurrences when a mobile telephone call ends prior to the call intentionally being ended by either caller, may sometimes be a problem associated with mobile telephone handsets. Call drops may occur, for example, during times of heavy antenna loading. Heavy antenna loading generally means that a great deal of bandwidth of the antenna is being used.

Better matching of the antenna may provide a reduction in call drops and a reduction in power consumption. It may not be possible for a mismatching issue to be corrected by tuning alone particularly during times of heavy antenna loading.

Complex values indicating incident (or forward power) and reflected power may be used to determine how well impedance is matched between an antenna and free space. For example, impedance is matched when all of the power to, for example, an antenna is transmitted, and none of the power is reflected back from the antenna to the transmitter. The complex values indicating incident and reflected power may be compared by comparing each of the magnitudes, i.e., by comparing the magnitude of the incident power to the magnitude of the reflected power; by comparing each of the phases, i.e., by comparing the magnitude of the incident phase to the magnitude of the reflected phase; or by comparing some combination of each of the magnitudes and phases, e.g., by comparing the magnitude and phase of the incident power to the magnitude and phase of the reflected power. Accordingly, in some examples, the complex values indicating how well impedance is matched between an antenna and free space, e.g., complex values indicating incident and reflected power, may be compared to select an antenna.

In some examples, complex values indicating incident (or forward power) and reflected power may be characterized to indicate a state of an antenna in an electronic device. For example, particular complex value may tend to indicate that an antenna is being covered by a user's hand or some other antenna issue that may impact the antenna function. Returning to the hand on the antenna example, when a user's hand is covering an antenna the complex values indicating incident (and reflected power may indicate that impedance is well match, i.e., little power is reflected back to the antenna. However, when a user's hand is covering an antenna it may be that some, most, or all of the power is being absorbed by the user's hand. Accordingly, while it may be that the complex values measured appear to indicate a well matched antenna, it may also be that the complex value still indicates that the antenna used should be switched because the energy to the antenna is being absorbed rather than actually transmitted beyond the general vicinity of the electronic device. In some examples, it may generally be necessary to characterize each antenna design to determine which complex values indicating incident and reflected power indicate that an antenna switch should occur or at least may be beneficial, e.g., when a user's hand or other item is blocking antenna transmission or reception.

Antenna systems may be characterized to determine when to switch antennas or when to consider switching antennas. Accordingly, possible complex values indicating incident and reflected power may be related to different areas on, for example, a Smith Chart (a plot of complex magnitude and phase). Some areas on the Smith Chart may be areas that tend to indicate an antenna is being blocked by, e.g., a user's hand or other item. Other areas on the Smith Chart may indicate that the antenna is poorly matched. Some areas on the Smith Chart may indicate that the antenna is both being blocked and is poorly matched. The areas on the Smith chart correspond to complex values indicating incident and reflected power. Thus, some values indicating incident and reflected power may be areas that tend to indicate an antenna is being blocked by, e.g., a user's hand or other item. Other values indicating incident and reflected power may indicate that the antenna is poorly matched. Some values indicating incident and reflected power may indicate that the antenna is both being blocked and is poorly matched. The particular areas on the Smith Chart or values indicating incident and reflected power that indicate that the antenna is being blocked may vary from antenna to antenna, from antenna design to antenna design, or from antenna system to antenna system. Accordingly, in some examples, it may be necessary to characterize a particular antenna, antenna design, or antenna system. Characterizing an antenna may involve, for example, placing the antenna in physical locations or physical states, such as in a location where the antenna is blocked, and measuring complex values indicating incident and reflected power. For example, incident and reflected power might be measured while a person holds the antenna. The measured incident and reflected power corresponds to a location on a Smith Chart. That location (or locations near it) may be considered areas on the Smith Chart that indicate the antenna is being blocked.

In some examples, complex values indicating incident and reflected power may be compared to select an antenna based on a comparison of the complex values indicating incident and reflected power to some combination of complex values indicating how well impedance is matched between an antenna and free space. In some examples, complex values indicating incident and reflected power may be compared to select an antenna based on a comparison of the complex values indicating incident and reflected power to some combination of complex values indicating if the antenna is or is not being blocked. In some examples, complex values indicating incident and reflected power may be compared to select an antenna based on a comparison of the complex values indicating incident and reflected power to some combination of complex values indicating how well impedance is matched between an antenna and free space as well as a comparison of the complex values indicating incident and reflected power to some combination of complex values indicating if the antenna is or is not being blocked.

FIG. 1 illustrates a example of "n" antennas (with three antennas actually drawn in the figure, antennas 102, 104, 106). It will be understood that the antennas 102, 104, 106 may correspond to individual antennas in an electronic communications system. Alternatively, the antennas 102, 104, 106 may correspond to different antenna configurations of a single antenna system. For example, mobile telephone handsets may use a printed wire board ground plane as a component of the mobile telephone handset antenna system. The ground plane may radiate and receive electromagnetic signals. The ground plane may include a plurality of feed points, for example. A change in the feed point may reconfigure the antenna system. Another way that may be used to change an antenna system configuration is to switch in or switch out some parasitic element coupled to the ground plane that is being used to radiate electromagnetic signals. The antennas 102, 104, 106 may correspond to these different antenna configurations using, e.g., a single ground plane with one or more of multiple feed points or parasitic elements that may be coupled or decoupled from the ground plane. It will be understood that the antennas in FIGS. 2-5 may also correspond to individual antennas in an electronic communications system or different antenna configurations of a single antenna system. Furthermore, the antennas in FIGS. 1-5 may correspond to some combination of individual antennas in an electronic communications system and different antenna configurations of one or more individual antenna systems.

In some examples, complex values for an antenna may be taken for different tuner settings. Accordingly, the complex values indicating how well impedance is matched between an antenna and free space for a plurality of tuner settings may be compared to select an antenna tuner setting. A combination of tuning and antenna selection may be used in some examples. For example, each antenna may be tuned as described herein and then each of the tuned antennas may be compared, as described herein.

Figure 2:
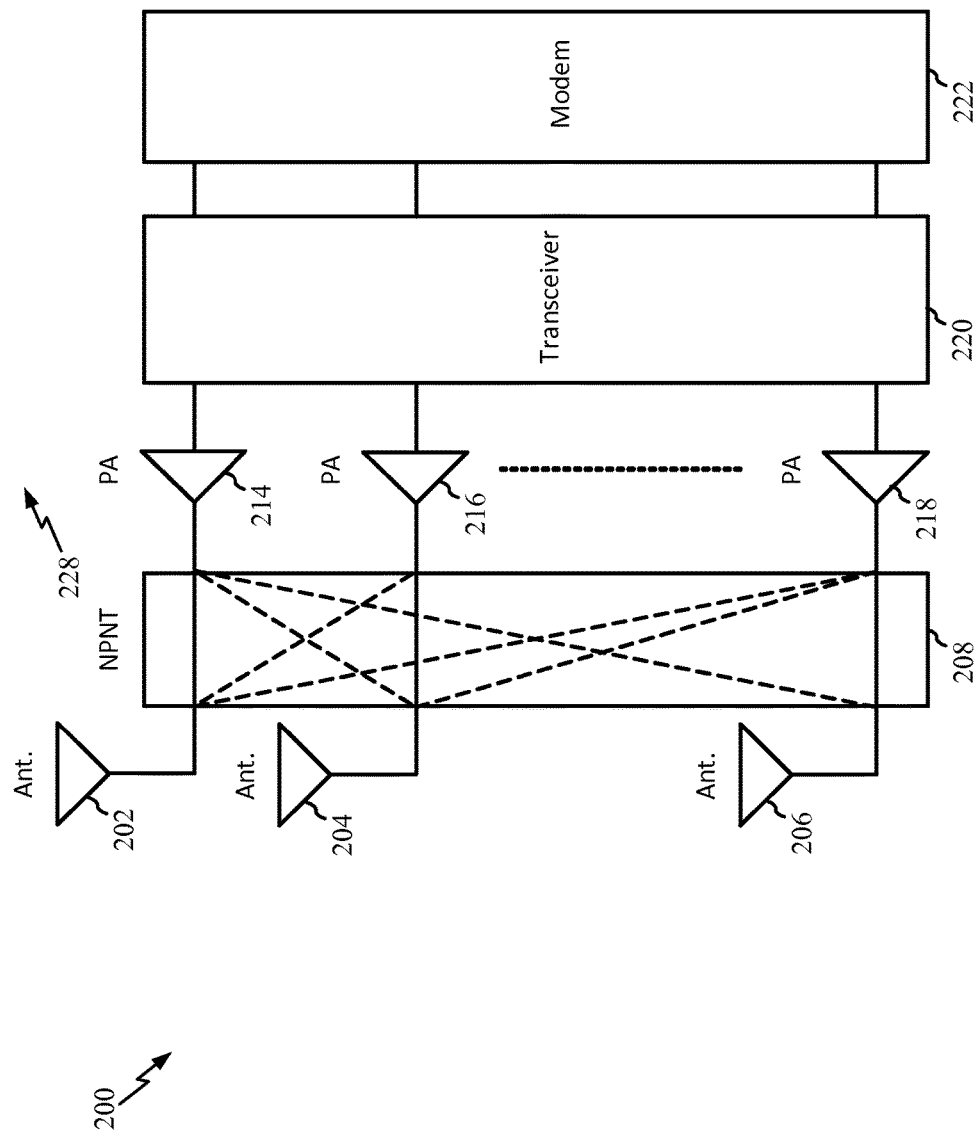
FIG. 2 is a diagram illustrating an example communication device in accordance with this disclosure.

FIG. 2 is a diagram illustrating an example communication device 200 in accordance with this disclosure. The communication device 200 includes antennas 202, 204, 206. The antennas 202, 204, 206 are attached to a bank of switches 208. The bank of switches 208 are "n" pole "n" throw (NPNT). Accordingly, if the bank of switches 208 includes two switches, then the switches in the bank of switches would be double pole double throw (DPDT). If the bank of switches 208 includes three switches, then the switches in the bank of switches would be triple pole triple throw (3P3T), and so on. Generally three switches would be used with three antennas 202, 204, 206. Accordingly any of the antennas 202, 204, 206 may be connected to any of power amplifiers 214, 216, 218. Thus, by using the bank of switches 208, any power amplifier 214, 216, 218 may drive any one of the antennas 202, 204, 206. In some examples, the particular antenna 202, 204, 206 selected may be based on the return loss results. Accordingly, based on the return loss results, the bank of switches 208 may connect a particular antenna 202, 204, 206, to a particular power amplifier 214, 216, 218.

Each of the power amplifiers 214, 216, 218 are connected to the transceiver 220. The transceiver 220 provides the input signals to the power amplifiers 214, 216, 218 and receives as its input modulated signals from the modem 222. The modem 222 encodes digital information that is to be transmitted using the communication device 200. In the transceiver 220 a high power detector (HDET) may be used to detect incident and reflected power (magnitude only). In some examples, the modem 222 may provide both magnitude and phase of both incident and reflected power. For example, this may be true if IQ is supported by the transceiver 220. Similar to the communication device 100, the communication device 200 may be part of a mobile telephone handset, for example.

The communication device 200 of FIG. 2 includes a plurality of antennas 202, 204, 206 and may implement a measurement device. The measurement device may be part of transceiver 220, part of other circuitry in the communication device 200, or some combination of circuitry in transceiver 220 and other circuitry. The measurement device may be configured to measure a complex value indicating how well impedance is matched between an antenna and free space. The communication device 200 of FIG. 2 may include an antenna selection controller configured to select one of the first antenna and the second antenna. The selection may be based on a measurement of a first complex value indicating how well impedance is matched between the first antenna and free space. The selection may also be based on the measurement of a second complex value indicating how well impedance is matched between the second antenna and free space.

Complex values indicating how well impedance is matched between an antenna and free space may be compared by comparing each of the magnitudes, by comparing each of the phases, or by comparing some combination of each of the magnitudes and phases. In an example, the length of each of the corresponding magnitudes and phases may be compared. Accordingly, in some examples, the complex values indicating how well impedance is matched between an antenna and free space may be compared to select an antenna.

Figure 3:
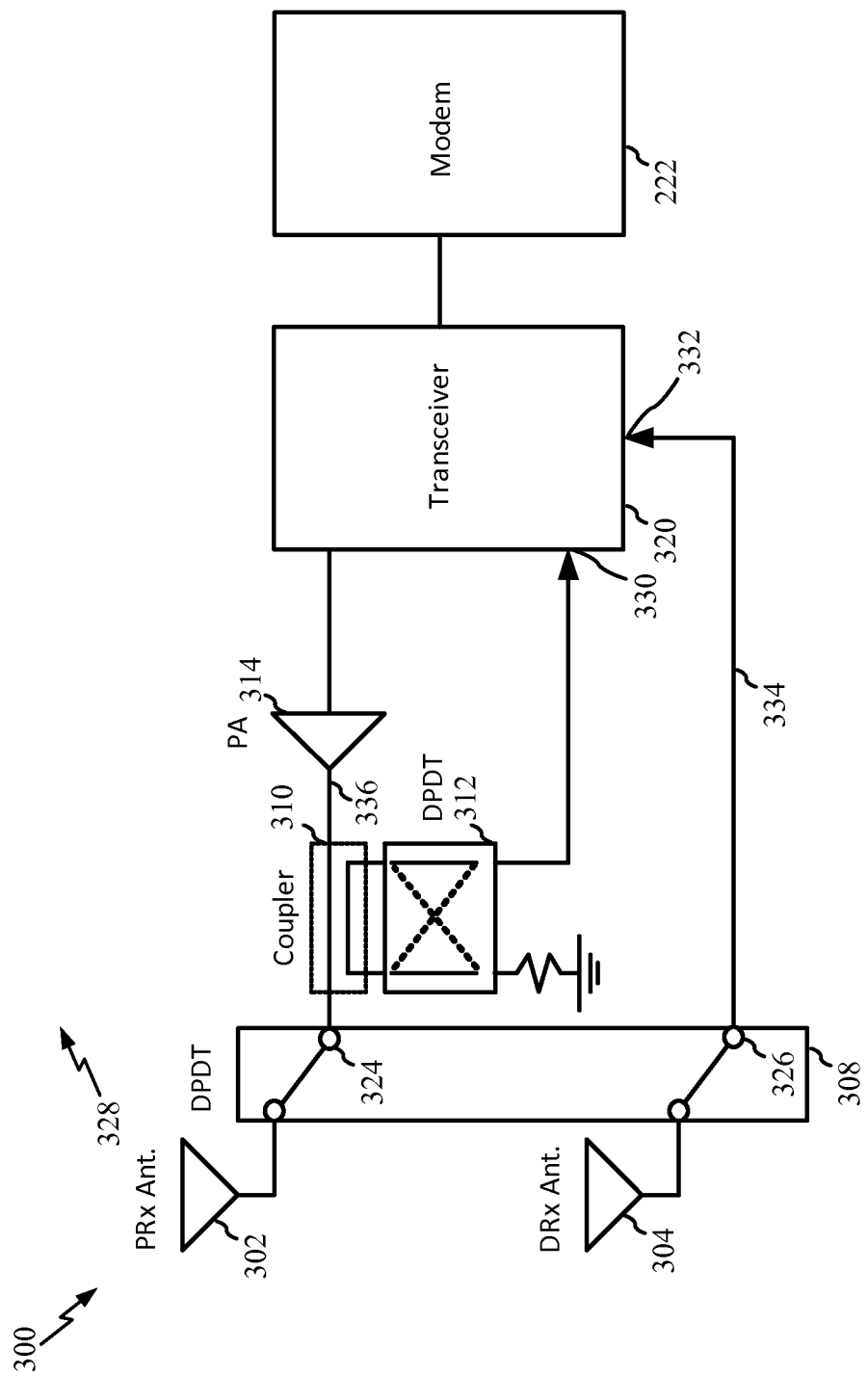
FIG. 3 is a diagram illustrating another example communication device in accordance with this disclosure.

FIG. 3 is a diagram illustrating another example communication device 300 in accordance with this disclosure. The communication device 300 includes a first antenna 302 and a second antenna 304. The first antenna 302 is coupled to a switch 324 in a bank of switches 308. The second antenna 304 is coupled to another switch 326 in the bank of switches 308.

As illustrated in FIG. 3, the antenna 302 is attached to coupler 310 through the bank of switches 308. More particularly, the antenna 302 is attached to coupler 310 through switch 324. The bank of switches 308 may alternatively connect antenna 304 to coupler 310. Coupler 310 may be used to measure a complex value indicating how well an impedance is matched between an antenna and free space, such as, for example, voltage standing wave ratio (VSWR). The VSWR measured at the location of the coupler 310 may provide an indication of VSWR at the antenna 302 (or antenna 304 depending on the antenna selected using the bank of switches 308). The coupler 310 may measure signals propagating out to the antenna 302 or reflected back from the antenna 302 based on the state of a switch 312. The switch 312 in the illustrated example is a DPDT switch. In one state, the switch 312 connects the antenna side of the coupler 310 to the ground and the amplifier side of coupler 310 to and input on transceiver 320. In another state, the switch 312 connects the antenna side of coupler 310 to the input on transceiver 320 and the amplifier side of coupler 310 to ground.

As illustrated in FIG. 3, measurement of a complex value indicating how well impedance is matched between an antenna and free space may be made using a directional coupler 310 and the switch 312. By using one directional coupler 310 in conjunction with the switch 312, a single directional coupler 310 may be used in place of two directional couplers to perform signal measurements on a transmission line as described herein. The switch 312 changes the connections on the coupler 310 allowing for measurements in either direction, i.e., measurements of signals from the amplifier 314 and measurements of signals reflected back from antenna 302.

It will be understood that similar measurements may be made for antenna 304 depending on the settings of the switch 308. In the illustrated example of FIG. 3, as the switch 324 is currently set, antenna 302 is connected to coupler 310. Accordingly, that is the antenna 302 illustrated as being measured. In the illustrated example of FIG. 3, antenna 304 is connected to the transceiver 320 input 332. Input 332 may provide a more direct input path to transceiver 320 separate from the coupler 310 or other circuitry. In other examples, signal path 334 may include circuitry the same or similar to the signal path 336.

When the switch 312 is set in one state, the directional coupler 310 develops a voltage $V_f$ indicative of the forward power. When the switch 312 is set in the other states, the directional coupler 310 develops a voltage $V_r$ indicative of the reflected power.

More specifically, a voltage $V_f$, which is indicative of the forward power, is measured when the switch 312 is configured such that the antenna side of the coupler is grounded, and the amplifier side of the coupler feeds into an input 330 to transceiver 320. As power is a function of voltage and current, i.e. p*v, the voltage $V_f$ is proportional to the forward power.

Conversely, $V_r$, indicative of the reflected power, is measured when the switch 312 is configured such that the antenna side of the coupler is connected to the input of transceiver 320 and the amplifier side of the coupler is connected to ground. As power is a function of voltage and current, as described above, the voltage $V_r$ is proportional to the reverse power.

After determining the voltage $V_f$ and the voltage $V_r$, the ratio $V_r/V_f$ may be determined. As described herein, a single directional coupler may be used to generate voltages $V_r$ and $V_f$. The voltages $V_r$ and $V_f$ are proportional to the forward power and reflected power, respectively. The ratio $V_r/V_f$ defines a voltage reflection coefficient, ρ. The voltage reflection coefficient, ρ, may be used to determine VSWR. VSWR is:

$$VSWR = (1+\rho)/(1-\rho) \qquad \text{Equation 1}$$

Voltages $V_r$ and $V_f$ may alternatively be applied to the input of transceiver 320. Circuitry within the transceiver 320 may store the information so that the VSWR or other figures of merit related to how well the antenna 302 is matched may be calculated. It will be understood that, if the state of the bank of switches 308 is changed, the same measurements may be made for the antenna 304. Another figure of merit related to how well an antenna is matched is the return loss. Return loss (RL), expressed in decibels may be defined as:

$$RL_{dB} = 20 \log(Vf/Vr) = 20 \log(1/\rho) \qquad \text{Equation 2}$$

Accordingly, the return loss is related to VSWR as indicated in Equation. 3:

$$RL_{dB} = 20 \log((VSWR+1)/(VSWR-1)) \qquad \text{Equation 3}$$

Equation 1 to Equation 3 may each be calculated using the measurements described above. Accordingly, VSWR and return loss may each be calculated from the measurements of Vf and $V_r$.

Using Equation 1 to Equation 3, complex values indicating how well impedance is matched between an antenna and free space may be generated. These complex values may be compared by comparing each of the magnitudes, by comparing each of the phases, or by comparing some combination of each of the magnitudes and phases. In an example, the length of each of the corresponding magnitudes and phases may be compared. Accordingly, in some examples, the complex values indicating how well impedance is matched between an antenna and free space may be compared to select an antenna.

FIG. 3 illustrates one example of a communication device 300 including a plurality of antennas 302, 304. The communication device 300 includes the first antenna 302 and the second antenna 304. The communication device 300 may also include a measurement device. The measurement device may include one or more of the coupler 310, the switch 312, and circuitry within transceiver 320. The circuitry within the transceiver 320 may be used to calculate, for example, VSWR return loss, or other values based on signals input into an input 330 to transceiver 320. The measurement device may be configured to measure a complex value indicating how well impedance is matched between an antenna 302, 304 and free space 328.

Some examples may include an antenna selection controller configured to select one of the first antenna and the second antenna. The selection may be based on a measurement of a first complex value indicating how well an impedance is matched between the first antenna and free space and the measurement of a second complex value indicating how well an impedance is matched between the second antenna and free space. The antenna selection controller may be part of transceiver 320, switch 308, some other component or components of communication device 300, or a combination of these.

The communication device 300 may further include a first switch configured to alternatively couple the first antenna and the second antenna to the measurement device. The first switch may be switch 308. The first switch may be switches 324 and 326. The measurement device measures the first complex value when the first antenna 302 is coupled to the measurement device. Alternatively, the measurement device measuring the second complex value when the second antenna 304 is coupled to the measurement device.

In some examples, as illustrated in FIG. 3, the communication device 300 includes a coupler 310 and a switch 312. The coupler may include a first signal connection and a second signal connection. Additionally, the coupler 310 may include a first signal measurement connection and a second signal measurement connection. The first signal connection may be coupled to the first switch. The second signal connection may be coupled to a power amplifier. The first signal measurement connection and the second signal measurement connection may alternatively be coupled to a ground and an input of a transceiver, such as an input to transceiver 320 based on a state of the switch 312.

In some examples, based on the state of switch 312, the first signal measurement connection is coupled to the ground and the second signal measurement connection is coupled to the transceiver to measure instant power. Alternatively, based on the state of the switch 312, the second signal measurement connection is coupled to the ground, and the first signal measurement connection is coupled to the transceiver to measure reflected power. In some examples, instant power, reflected power, or both are determined by measuring voltages, which are proportional to the power.

The antenna system of claim 1, wherein the first complex value and the second complex value are transformed to a first return loss and a second return loss respectively and the antenna selection controller is configured to select one of the first antenna and the second antenna based on the first return loss and the second return loss.

In some examples each signal path 336, 334 may include a measurement device. Accordingly, a first measurement device may be coupled to the first antenna 302. The first measurement device may be configured to measure the first complex value for the first antenna. A second measurement device may be coupled to the second antenna 304. The second measurement device may be configured to measure the second complex value for the second antenna 304. The first complex value and the second complex value may be transformed to a first return loss and a second return loss respectively and the antenna selection controller may be configured to select one of the first antenna and the second antenna based on the first return loss and the second return loss.

When a radio, such as a transmitter, receiver, or transceiver, provides a signal to an antenna or receives a signal from an antenna it may generally be preferable for the radio and the transmission medium, e.g., free space, transmission line, or other transmission medium, to be well matched. The radio may include a radio in a mobile telephone handset, "smart" phones, or other electronic devices.

The voltage standing wave ratio (VSWR) is a figure of merit that can indicate how well an antenna is impedance matched to the radio or how well the antenna is matched to the transmission medium. In other words, a VSWR measurement may be made between the radio and the antenna, between the antenna and the transmission medium, to name a couple of examples of potential VSWR measurements.

VSWR is related to matching between components, e.g., the antenna and the radio or the antenna and the transmission medium. Accordingly, VSWR is a function of the reflection coefficients for the respective connection, e.g., antenna to radio or antenna to transmission line, to name a few.

Smaller values of VSWR indicate less reflection and a better match between the antenna and the radio (or the antenna and the transmission line). As may be determined from equation 1 above, the lowest possible value for VSWR is 1. For example, if no reflections coefficient is 0, then the result of Equation 1 is 1. When the reflection coefficient is 0 no reflections are occurring, i.e., the antenna and the radio or the antenna and the transmission medium are perfectly matched. No power is being reflected when the VSWR is 1. As reflections at an interface increase the VSWR increases. The interface may be the connection between an antenna and a radio or an antenna and a transmission medium. Performance may decrease as VSWR increases. Accordingly, lower values of VSWR may be preferable.

VSWR may vary based on external factors. For example, the VSWR from an antenna and a transmission medium may vary depending on the position of the radio. When the radio is free-standing, the VSWR between the antenna attached to the radio and the transmission medium may have one value. When the radio is being held, such as when a person holds a mobile telephone handset, the VSWR between the antenna attached to the radio and the transmission medium may have another value. If a radio is being held, the antenna may be blocked by part of the holder's body. For example, if a mobile telephone handset is held to the person's head, the person's head may block the antenna. The mobile telephone handset's antenna may be blocked by the person's hand or another body part.

Some radios (or sets of radios) may have multiple antennas. For example, multiple antenna electronic devices may come in various configurations, for example, a single radio in the multiple antenna electronic device may have multiple antennas. The multiple antenna electronic device may have multiple radios, each one of the multiple radios having one antenna, multiple radios with multiple antennas, or some combination of these, e.g., multiple radios with some of the multiple radios having a single antenna and some of the radios having multiple antennas.

Regardless of the configuration of the multiple antenna electronic device, it may be preferable to select one or more antennas of a set of antennas. For example, one or more of the antennas of the set of antennas may be performing better than one or more other antennas in the set. Accordingly, it may be preferable to select one or more antennas with the best VSWR and use the one or more antennas to transmit signal(s).

The VSWR is a complex number. Accordingly, the VSWR has both a real component and an imaginary component. Generally, some examples may use the real component of VSWR to determine an antenna or antennas to select and use. It may be preferable, however, in some examples, to use a complex indication of signal reflection such as the complex value, e.g., having real and imaginary components, of VSWR to select an antenna or antennas. Using both the real and the imaginary components of VSWR may improve the selection process.

In some examples, the complex indication of signal reflection may also be used to tune antennas. Tuning the antenna may improve performance of the antenna. Some examples may tune each antenna in a set of multiple antennas such that each antenna is generally providing. Using both the real and the imaginary components of VSWR may improve the selection process.

As described herein, complex values indicating how well impedance is matched between an antenna and free space may be generated. These complex values may be compared by comparing each of the magnitudes, by comparing each of the phases, or by comparing some combination of each of the magnitudes and phases. In an example, the length of each of the corresponding magnitudes and phases may be compared. Accordingly, in some examples, the complex values indicating how well impedance is matched between an antenna and free space may be compared to select an antenna.

Figure 4:
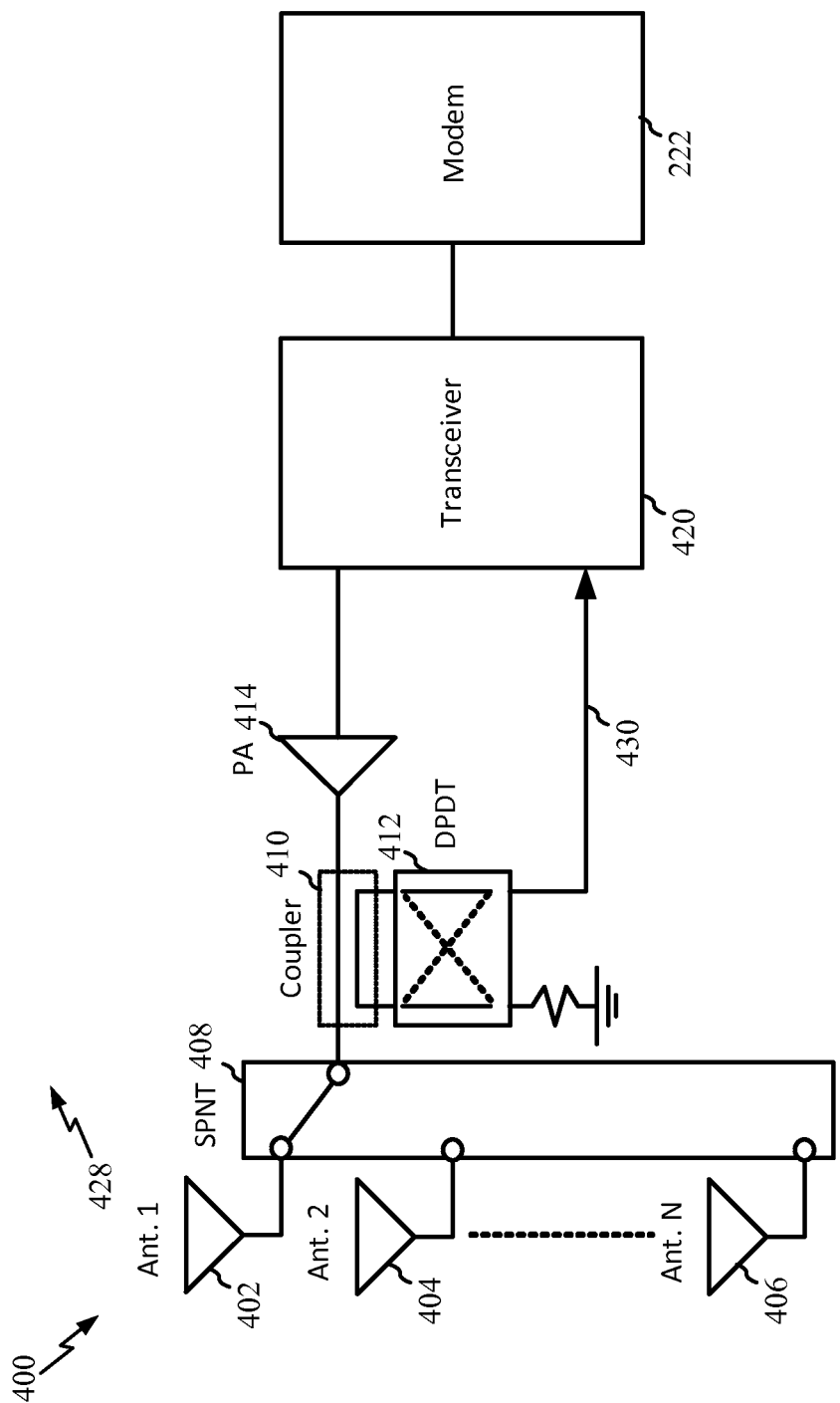
FIG. 4 is a diagram illustrating another example communication device in accordance with this disclosure.

FIG. 4 is a diagram illustrating another example communication device 400 in accordance with this disclosure. The communication device 400 is generally similar to the communication device 300 of FIG. 3; however, the communication device 400 includes "N" antennas, whereas the communication device 300 includes two antennas 302, 304. N may be any whole number, e.g., 1, 2, 3, 4 . . . . However, N will generally be 2 or greater to take advantage of antenna selection systems and methods described herein. In some examples, a single antenna system may use a single coupler measurement system as described herein, however.

A first antenna 402, a second antenna 404, and an Nth antenna 406 are each coupled to a bank of switches 408. As illustrated in FIG. 4, the antenna 402 is attached to coupler 410 through the bank of switches 408. The bank of switches 408 may alternatively connect antenna 404 or antenna 406 to coupler 410. Coupler 410 may be used to measure a complex value indicating how well an impedance is matched between an antenna and free space, such as, for example, voltage standing wave ratio (VSWR). The VSWR may be measured at the location of the coupler 410 and may provide an indication of VSWR at the antenna 402 (or other antennas depending on the antenna selected using the bank of switches 408). The coupler 410 may measure signals propagating out to the antenna 402 or reflected back from the antenna 402 based on the state of a switch 412. The switch 412, in this example, is a DPDT switch. In one state, the switch 412 connects the antenna side of the coupler 410 to the ground and the amplifier side of coupler 410 to and input on transceiver 420. In another state, the switch 412 connects the antenna side of coupler 410 to the input on transceiver 420 and the amplifier side of coupler 410 to ground.

As illustrated in FIG. 4, measurement of a complex value indicating how well impedance is matched between an antenna and free space may be made using the directional coupler 410 and the switch 412. By using one directional coupler 410 in conjunction with the switch 412, a single directional coupler 410 may be used in place of two directional couplers. Similarly to the switch 312 of FIG. 3, the switch 412 changes the connections on the coupler 410 allowing for measurements in either direction, i.e., measurements of signals from the amplifier 414 and measurements of signals reflected back from antenna 402. It will be understood that similar measurements may be made for all N antennas, e.g., antenna 404 and antenna 406, depending on the settings of the bank of switches 408. In the illustrated example of FIG. 4, as the bank of switches 408 is currently set, antenna 402 is connected to coupler 410. Accordingly, that the antenna 402 is illustrated as being measured (or capable of being measured in the current configuration).

When the switch 412 is set in one state, the directional coupler 410 develops a voltage $V_f$ indicative of the forward power. When the switch 412 is set in the other states, the directional coupler 410 develops a voltage $V_r$ indicative of the reflected power. As described with respect to FIG. 3, $V_f$, indicative of the forward power, is measured when the switch 312 is configured such that the antenna side of the coupler is grounded, and the amplifier side of the coupler feeds into the input to transceiver 320. Conversely, $V_r$, indicative of the reflected power, is measured when the switch 312 is configured such that the antenna side of the coupler is connected to the input of transceiver 320, and the amplifier side of the coupler is connected to ground FIG. 4 illustrates one example of a communication device 400 including a plurality of antennas 402, 404, 406. The communication device 400 may include a first antenna 402, a second antenna 404, and an Nth antenna 406. The communication device 400 may also include a measurement device. For example, the measurement device may include one or more of the coupler 410, the switch 412, and circuitry within transceiver 420. The circuitry within the transceiver 420 may be used to calculate, for example, VSWR or other values based on the input 430 to transceiver 420. The measurement device may be configured to measure a complex value indicating how well impedance is matched between an antenna 402, 404, 406, and free space 428.

Some examples may include an antenna selection controller configured to select one of the first antenna and the second antenna. The selection may be based on a measurement of a first complex value indicating how well impedance is matched between the first antenna and free space and the measurement of a second complex value indicating how well an impedance is matched between the second antenna and free space. The antenna selection controller may be part of transceiver 420, the bank of switches 408, some other component or components of communication device 400, or a combination of these.

In some examples, the communication device 400 may include three or more antennas 402, 404, 406. The three or more antennas 402, 404, 406 may be configured to be coupled to the measurement device through the bank of switches 408. In some examples, the measurement device may be configured to measure a complex value indicating how well impedance is matched between an antenna 402, 404, 406 and free space 428 for each of the three or more antennas 402, 404, 406. The controller may be configured to select an antenna 402, 404, 406 based on the measurements of complex values indicating impedance matches between each of the antennas 402, 404, 406 and free space 428 of each of the three or more antennas 402, 404, 406.

Measurements for N complex values, one for each of the N antennas 402, 404, 406, may be transformed to N return losses and the antenna selection controller may be configured to select one of the N antennas based on the N return losses.

Complex values indicating how well impedance is matched between an antenna and free space may be generated for each of the N antennas. These N complex values may be compared by comparing each of the magnitudes, by comparing each of the phases, or by comparing some combination of each of the magnitudes and phases. In an example, the length of each of the corresponding magnitudes and phases may be compared. Accordingly, in some examples, the complex values indicating how well impedance is matched between an antenna and free space may be compared to select an antenna.

Figure 5:
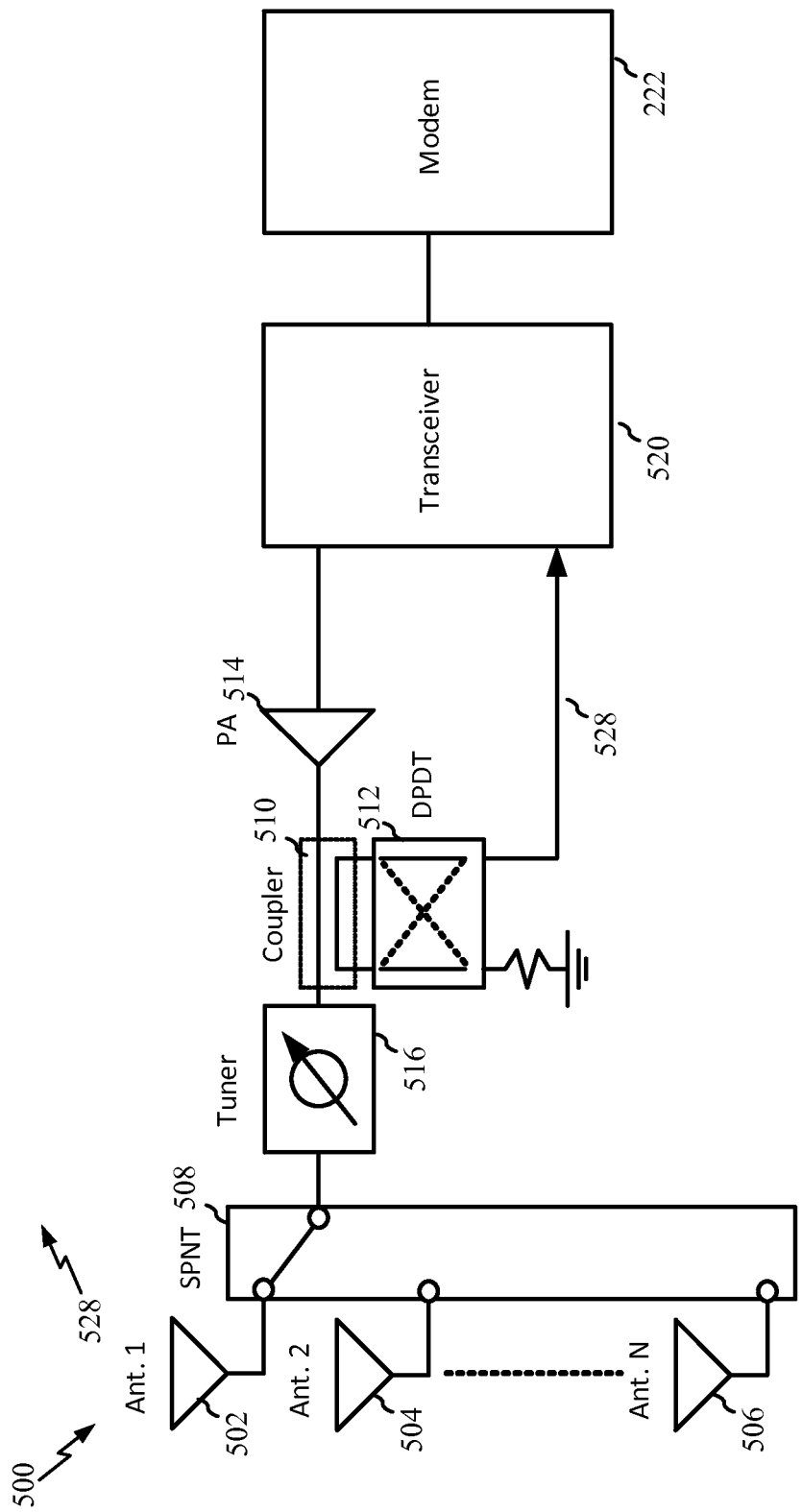
FIG. 5 is a diagram illustrating another example communication device in accordance with this disclosure.

FIG. 5 is a diagram illustrating another example communication device 500 in accordance with this disclosure. The example communication device 500 is generally similar to the communication device 300 of FIG. 3 and the communication device 400 of FIG. 4. Unlike the communication device 300 of FIG. 3, the communication device 500 includes N antennas. Unlike the communication device 400 of FIG. 4 and the communication device 300 of FIG. 3, the communication device 500 of FIG. 5 includes a tuner 516. The communication device 500 includes a first antenna 502, a second antenna 504, and an Nth antenna 506. The antennas 502, 504, 506 are coupled to a bank of switches 508.

As illustrated in FIG. 5, the antenna 502 is attached to coupler 510 through the bank of switches 508. The bank of switches 508 may alternatively connect antennas 502, 504, 506 to coupler 510. The coupler 510 may be used to measure a complex value indicating how well an impedance is matched between an antenna and free space, such as, for example, voltage standing wave ratio (VSWR). Depending on the antenna 502, 504, 506 connected, the VSWR measured at the location of the coupler 510 may provide an indication of VSWR at the antenna 502, 504, 506. The coupler 510 may measure signals propagating out to the antenna 502 or reflected back from the antenna 502, 504, 506 based on the state of a switch 512 (and the state of the bank of switches 508). The switch 512 is a DPDT switch. In one state, the switch 512 connects the antenna side of the coupler 510 to the ground and the amplifier side of coupler 510 to and input on transceiver 520. In another state, switch 512 connects the antenna side of coupler 510 to the input on transceiver 520 and the amplifier side of coupler 510 to ground.

As illustrated in FIG. 5, measurement of a complex value indicating how well impedance is matched between an antenna and free space may be made using a directional coupler 510 and the switch 512. By using one directional coupler 510 in conjunction with the switch 512 a single or single directional coupler 510 may be used in place of two directional couplers in a transmission line. The switch 512 changes the connections on the coupler 510 allowing for measurements in either direction, i.e., measurements of signals from the amplifier 514 and measurements of signals reflected back from antenna 502. It will be understood that similar measurements may be made for antenna 504 depending on the settings of the switch 508. In the illustrated example of FIG. 5, as the switch 508 is currently set, antenna 502 is connected to coupler 510, through tuner 516. Accordingly, that the antenna 502 illustrated as being measured.

When the switch 512 is set in one state, the directional coupler 510 develops a voltage $V_f$ indicative of the forward power. When the switch 512 is set in the other states, the directional coupler 510 develops a voltage $V_r$ indicative of the reflected power.

$V_f$, indicative of the forward power, is measured when the switch 512 is configured such that the antenna side of the coupler is grounded, and the amplifier side of the coupler feeds into the input to transceiver 520. Conversely, indicative of the reflected power, is measured when the switch 512 is configured such that the antenna side of the coupler is connected into the input of transceiver 520 and the amplifier side of the coupler is connected to ground. The ratio $V_r/V_f$ defines a voltage reflection coefficient ρ. The VSWR may be determined as described here and may be used make adjustments to the tuner 516 for a particular antenna 502, 504, 506.

For example, the tuner 516 may be coupled between the bank of switches 508 and the measurement device, e.g., coupler 510, switch 512 and transceiver 520. The tuner 516 may be configured to tune antenna 502 when antenna 502 is coupled to the measurement device, tune antenna 504 when antenna 504 is coupled to the measurement device, and tune antenna 506 when antenna 506 is coupled to the measurement device.

Complex values indicating how well impedance is matched between an antenna and free space may be compared by comparing each of the magnitudes, by comparing each of the phases, or by comparing some combination of each of the magnitudes and phases. In an example, the length of each of the corresponding magnitudes and phases may be compared. Accordingly, in some examples, the complex values indicating how well impedance is matched between an antenna and free space may be compared to select an antenna.

In some examples, complex values for an antenna may be taken for different tuner settings. Accordingly, the complex values indicating how well impedance is matched between an antenna and free space for a plurality of tuner settings may be compared to select an antenna tuner setting. A combination of tuning and antenna selection may be used in some examples. For example, each antenna may be tuned as described herein and then each of the tuned antennas may be compared, as described herein.

In some examples, some complex values indicating how well impedance is matched between an antenna and free space may be preferable to other complex values indicating how well impedance is matched between an antenna and free space. For example, complex values indicating how well impedance is matched between an antenna may be plotted on a Smith chart. Some portions of the Smith chart may be preferable to other portions of the Smith chart.

Accordingly, an antenna with a complex value indicating how well impedance is matched between an antenna and free space that falls in a preferred area of a Smith chart may be selected rather than an antenna with a complex value indicating how well impedance is matched between an antenna and free space that falls in a less preferred area of a Smith chart.

Figure 6:
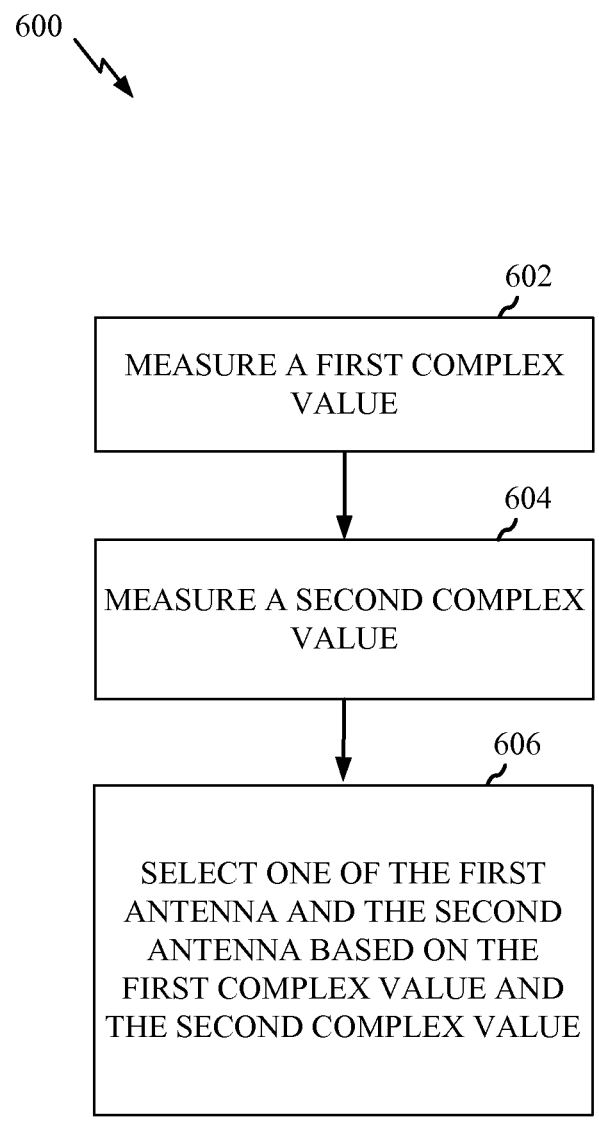
FIG. 6 is a flowchart of a method related to communication devices in accordance with this disclosure.

FIG. 6 is a flowchart of a method related to communication devices in accordance with this disclosure. At step 602, circuitry may measure a first complex value indicative of an impedance match between a first antenna and free space. The circuitry used to measure the first complex value indicating how well impedance is matched between a first antenna and free space may include circuitry in transceiver 220, 320, 420, 520; coupler 310, 410, 510, and switch 312, 412, 512. Depending on the setting of the switch 312, 412, 512 the directional coupler 310, 410, 510 may develops a voltage $V_r$ indicative of the reflected power or $V_f$, indicative of the forward power. These voltages may be used to determine a complex value indicating how well impedance is matched between an antenna and free space. In a two antenna example, measure a first complex value indicating how well impedance is matched between a first antenna and free space may include coupling the first antenna to a measurement device and measuring the first complex value when the first antenna is coupled to the measurement device.

At step 604, circuitry may measure a second complex value indicative of an impedance match between a second antenna and free space. The circuitry used to measure the second complex value indicating how well impedance is matched between a first antenna and free space may include circuitry in transceiver 220, 320, 420, 520; coupler 310, 410, 510, and switch 312, 412, 512. In a two antenna example, measure a second complex value indicating how well impedance is matched between a second antenna and free space may include coupling the second antenna to a measurement device, and measuring the second complex value when the second antenna is coupled to the measurement device.

At step 606, circuitry may select one of the antennas 202, 204, 206, 302, 304, 402, 404, 406, 502, 504, 506 based on the measurement of the complex values. The selection may be made by transceiver 220, 320, 420, 520 or other processing circuitry. The selection may be implemented using the bank of switches 208, 308, 408, 508 to connect the selected antenna 202, 204, 206, 302, 304, 402, 404, 406, 502, 504, 506 to the rest of the circuitry.

Some examples of the method illustrated in FIG. 6 may alternatively measuring the first complex value and measuring the second complex value. Accordingly, such an example may couple a first signal measurement connection to ground and a second signal measurement connection to a transceiver to measure an instant power and coupling a second signal measurement connection to a ground and a first signal measurement connection to a transceiver to measure a reflected power. Other examples may use a first measurement device to measure the first complex value and use a second measurement device to measure the second complex value for the second antenna. As described herein selections may be made by processing circuitry that may be in transceiver 520 or in other circuitry in the communication device 200, 300, 400, 500. Some examples may select between three or more antennas 202, 204, 206, 402, 404, 406, 502, 504, 506.

In some examples, the measurements may include measuring complex values indicating how well impedances are matched between each of the three or more antennas and free space. Selecting an antenna may be based on measurements of complex values indicating impedance matches between each of the antennas and free space of each of the three or more antennas.

In some examples, the first complex value and the second complex value are transformed to a first return loss and a second return loss respectively, e.g., according to Equation 3. Selecting one of the first antenna and the second antenna may be based on the first return loss and the second return loss.

As described herein, a communication device 200, 300, 400, 500 may include a plurality of antennas 202, 204, 206, 302, 304, 402, 404, 406, 502, 504, 506. Additionally, the communication device 200, 300, 400, 500 may include means for measuring a first complex value indicative how well an impedance is matched between a first antenna 202, 204, 206, 302, 304, 402, 404, 406, 502, 504, 506 and free space 228, 328, 428, 528. The means for measuring a first complex value indicating how well an impedance is matched between a first antenna 202, 204, 206, 302, 304, 402, 404, 406, 502, 504, 506 and free space 228, 328, 428, 528 may include transceiver 220, 320, 420, 520, coupler 310, 410, 510, and switch 312, 412, 512 to name a few of the circuits that may be used to perform this function.

Additionally, the communication device 200, 300, 400, 500 may include means for measuring a second complex value indicative how well an impedance is matched between a second antenna 202, 204, 206, 302, 304, 402, 404, 406, 502, 504, 506 and free space 228, 328, 428, 528. The means for measuring a second complex value indicating how well an impedance is matched between a second antenna 202, 204, 206, 302, 304, 402, 404, 406, 502, 504, 506 and free space 228, 328, 428, 528 may also include transceiver 220, 320, 420, 520, coupler 310, 410, 510, and switch 312, 412, 512 to name a few of the circuits that may be used to perform this function.

Furthermore, the communication device 200, 300, 400, 500 may include means for selecting one of the first antenna 202, 204, 206, 302, 304, 402, 404, 406, 502, 504, 506 and the second antenna 202, 204, 206, 302, 304, 402, 404, 406, 502, 504, 506 based on the measurement of the first complex value and the measurement of the second complex. The means for selecting may include processing functionality in the transceiver 220, 320, 420, 520, or elsewhere in the communication device 200, 300, 400, 500. The means for selecting may include the bank of switches 208, 308, 408, 508, circuitry controlling the bank of switches 208, 308, 408, 508, or both.

The means for coupling the first antenna 202, 204, 206, 302, 304, 402, 404, 406, 502, 504, 506 to a measurement device may include the bank of switches 208, 308, 408, 508, and more particularly, one or more switches in the bank of switches 208, 308, 408, 508, such as switch 324.

The means for measuring the first complex value when the first antenna 202, 204, 206, 302, 304, 402, 404, 406, 502, 504, 506 is coupled to the measurement device may include transceiver 220, 320, 420, 520, coupler 310, 410, 510, and switch 312, 412, 512 to name a few of the circuits that may be used to perform this function.

The means for coupling the second antenna 202, 204, 206, 302, 304, 402, 404, 406, 502, 504, 506 to a measurement device may include the bank of switches 208, 308, 408, 508, and more particularly, one or more switches in the bank of switches 208, 308, 408, 508, such as switch 326.

The means for measuring the second complex value when the second antenna 202, 204, 206, 302, 304, 402, 404, 406, 502, 504, 506 is coupled to the measurement device may include transceiver 220, 320, 420, 520, coupler 310, 410, 510, and switch 312, 412, 512 to name a few of the circuits that may be used to perform this function.

In some examples, the means for alternatively measuring the first complex value and measuring the second complex value may include the bank of switches 208, 308, 408, 508, and more particularly, one or more switches in the bank of switches 208, 308, 408, 508, such as switch 324 or switch 326. The means for alternatively measuring the first complex value and measuring the second complex value may also include transceiver 220, 320, 420, 520, coupler 310, 410, 510, and switch 312, 412, 512 to name a few of the circuits that may be used to perform this function.

In some examples, the means for coupling a first signal measurement connection to ground and a second signal measurement connection to a transceiver to measure an instant power and the means for coupling a second signal measurement connection to a ground and a first signal measurement connection to a transceiver to measure a reflected power may include the switch 312, 412, 512.

The means for using a first measurement device to measure the first complex value and the means for using a second measurement device to measure the second complex value for the second antenna 202, 204, 206, 302, 304, 402, 404, 406, 502, 504, 506 may include, for example, couplers 310, 410, 510, as well as an additional coupler (not shown) on another antenna 202, 204, 206, 302, 304, 402, 404, 406, 502, 504, 506 input signal, output signal, or input/output signal, such as signal path 334 of FIG. 3.

In some examples, the means for selecting between three or more antennas 202, 204, 206, 402, 404, 406, 502, 504, 506 may include switch 208, 408, 508. The means for selecting between three or more antennas may also include any control circuitry that is configured to control the switch 208, 408, 508.

In some examples, the means for measuring complex values indicating how well impedances are matched between each of the three or more antennas and free space may include transceiver 220, 420, 520, coupler 410, 510, switch 412, 512, as well as other circuitry configured for measuring complex values indicating how well impedances are matched between each of the three or more antennas and free space.

In some examples, the means for selecting an antenna based on measurements of complex values indicating impedance matches between each of the antennas and free space of each of the three or more antennas may include processing circuitry, for example, processing circuitry in the transceiver 220, 420, 520. The processing circuitry may compare the complex values indicating impedance matches between each of the antennas and free space and select the best-matched antenna, e.g., the antenna with the lowest VSWR.

In some examples, the means for tuning the first antenna when the first antenna is coupled to a measurement device and means for tuning the second antenna when the second antenna is coupled to the measurement device may include tuner 516 of FIG. 5.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An antenna system including a plurality of antennas, the antenna system comprising:
    a first antenna;
    a second antenna;
    a measurement device, the measurement device configured to measure at least a first complex value indicative of an impedance matching of the first antenna and a second complex value indicative of an impedance matching of the second antenna;
    an antenna selection controller configured to select one of the first antenna and the second antenna based on the measurement of the first complex value of the first antenna and the measurement of the second complex value of the second antenna;
    a coupler; and
    first and second switches,
    wherein the coupler has a first signal connection and a second signal connection and a first signal measurement connection and a second signal measurement connection, the first signal connection coupled to the first switch, the second signal connection coupled to a power amplifier, the first signal measurement connection and the second signal measurement connection alternatively coupled to ground and a transceiver based on a state of the second switch.

2. The antenna system of claim 1, wherein the first and second complex values indicate first and second voltage standing wave ratio (VSWR) values of the respective first and second antennas.

3. The antenna system of claim 2, wherein the selection is based on a comparison of the first complex value and the second complex value to complex values indicating an antenna transmission blockage.

4. The antenna system of claim 2, wherein the selection is based on a comparison between the first complex value and the second complex value to determine which of the first and second antennas is better matched.

5. The antenna system of claim 1, wherein the measurement device is further configured to:
    measure the first complex value when the first antenna is coupled to the measurement device; and
    measure the second complex value when the second antenna is coupled to the measurement device.

6. The antenna system of claim 1, wherein the first signal measurement connection is coupled to ground and the second signal measurement connection is coupled to the transceiver to measure an instant power and wherein the second signal measurement connection is coupled to ground and the first signal measurement connection is coupled to the transceiver to measure a reflected power.

7. The antenna system of claim 1, wherein the measurement device comprises a first measurement device coupled to the first antenna, the first measurement device configured to measure the first complex value of the first antenna and a second measurement device coupled to the second antenna, the second measurement device configured to measure the second complex value of the second antenna.

8. The antenna system of claim 1, further comprising at least a third antenna, the at least third antenna configured to be coupled to the measurement device through a third switch, wherein the measurement device is further configured to measure at least a third complex value indicative of an impedance matching between the at least third antenna and free space.

9. The antenna system of claim 8, wherein the antenna selection controller is further configured to select the one of the first, second, and at least third antennas based on the measured at least the third complex value.

10. The antenna system of claim 1, wherein the first complex value and the second complex value are transformed to a first return loss and a second return loss respectively and the antenna selection controller is configured to select one of the first antenna and the second antenna based on the first return loss and the second return loss.

11. The antenna system of claim 1, further comprising a tuner coupled between the first switch and the measurement device, the tuner configured to tune the first antenna when the first antenna is coupled to the measurement device and to tune the second antenna when the second antenna is coupled to the measurement device.

12. A method for an antenna system including a plurality of antennas, the method comprising:
    measuring a first complex value indicative of an impedance match between a first antenna and free space;
    measuring a second complex value indicative of an impedance match between a second antenna and free space;
    selecting one of the first antenna and the second antenna based on the measurement of the first complex value and the measurement of the second complex value; and
    coupling a first signal measurement connection to ground and a second signal measurement connection to a transceiver to measure an instant power and coupling the second signal measurement connection to ground and the first signal measurement connection to the transceiver to measure a reflected power.

13. The method of claim 12, wherein the first and second complex values indicate first and second voltage standing wave ratio (VSWR) values of the respective first and second antennas.

14. The method of claim 13, wherein the selecting is performed by comparing the first complex value and the second complex value to complex values indicating whether antenna transmission is being blocked.

15. The method of claim 13, wherein the selection is performed by comparing the first complex value and the second complex value to determine which antenna of the first and second antennas is better matched.

16. The method of claim 12, further comprising:
coupling the first antenna to a measurement device;
measuring the first complex value when the first antenna is coupled to the measurement device;
coupling the second antenna to the measurement device; and
measuring the second complex value when the second antenna is coupled to the measurement device.

17. The method of claim 12, further comprising alternatively measuring the first complex value and measuring the second complex value.

18. The method of claim 12, further comprising using a first measurement device to measure the first complex value and using a second measurement device to measure the second complex value for the second antenna.

19. The method of claim 12, wherein the first complex value and the second complex value are transformed to a first return loss and a second return loss respectively and selecting one of the first antenna and the second antenna based on the first return loss and the second return loss.

20. The method of claim 12, further comprising tuning the first antenna when the first antenna is coupled to a measurement device and to tuning the second antenna when the second antenna is coupled to the measurement device.

21. An antenna system including a plurality of antennas, the antenna system comprising:
means for measuring a first complex value indicative of an impedance match between a first antenna and free space;
means for measuring a second complex value indicative of an impedance match between a second antenna and free space;
means for selecting one of the first antenna and the second antenna based on the measurement of the first complex value and the measurement of the second complex value; and
means for coupling a first signal measurement connection to ground and a second signal measurement connection to a transceiver to measure an instant power and means for coupling the second signal measurement connection to ground and the first signal measurement connection to the transceiver to measure a reflected power.

22. The antenna system of claim 21, wherein the first and second complex values indicate voltage standing wave ratio (VSWR) values of the respective first and second antennas.

23. The antenna system of claim 22, wherein the selecting is performed by comparing the first complex value and the second complex value to complex values indicating whether antenna transmission is being blocked.

24. The antenna system of claim 22, wherein the means for selecting selects the one of the first antenna and the second antenna with a smaller indicated VSWR value.

25. The antenna system of claim 22, wherein the selection is performed by comparing the first complex value and the second complex value to determine which antenna of the first and second antennas is better matched.

26. The antenna system of claim 21, further comprising:
means for coupling the first antenna to a measurement device;
means for measuring the first complex value when the first antenna is coupled to the measurement device;
means for coupling the second antenna to the measurement device; and
means for measuring the second complex value when the second antenna is coupled to the measurement device.

27. The antenna system of claim 21, further comprising means for alternatively measuring the first complex value and measuring the second complex value.

\* \* \* \* \*